Figure 4:
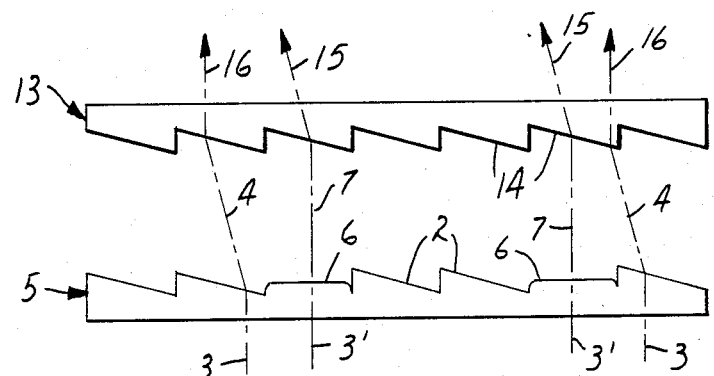

United States Patent [19]

Brady, Jr.

[11] Patent Number: 4,497,860
[45] Date of Patent: Feb. 5, 1985

[54] IMAGEABLE PRISMATIC ARRAY

[75] Inventor: Harold E. Brady, Jr., St. Paul, Minn.

[73] Assignee: Minnesota Mining and Manufacturing Company, St. Paul, Minn.

[21] Appl. No.: 970,548

[22] Filed: Dec. 18, 1978

[51] Int. Cl.³ .............................................. G02B 27/10
[52] U.S. Cl. ................... 428/156; 346/77 E; 350/167; 353/120; 365/124; 430/12; 430/946; 428/913; 428/918
[58] Field of Search ................... 96/1.1; 428/156, 913, 428/918; 340/146.3 P; 346/77 E, 134, 136; 365/124, 125; 430/12, 946; 350/167; 353/120, 122, DIG. 5

[56] References Cited

U.S. PATENT DOCUMENTS

| | | | |
|---|---|---|---|
| 2,124,139 | 7/1938 | Eggert | 350/167 |
| 2,499,453 | 3/1950 | Bonnet | 350/167 |
| 3,312,955 | 4/1967 | Lamberts et al. | 365/124 |
| 3,388,027 | 6/1968 | Altman | 428/918 |
| 3,406,405 | 10/1968 | Somers | 346/77 E |
| 3,560,206 | 2/1971 | Jvirblis | 96/1.1 |
| 3,669,673 | 6/1972 | Ih et al. | 96/27 H |
| 3,689,692 | 9/1972 | Ih | 346/136 |
| 3,698,892 | 10/1972 | Heurtley | 96/1.1 |
| 3,782,805 | 1/1974 | Brown | 350/167 |
| 3,814,904 | 6/1974 | Russell et al. | 235/61.11 E |
| 3,892,473 | 7/1975 | Ando et al. | 365/124 |
| 3,989,775 | 11/1976 | Jack et al. | 264/1 |
| 4,012,115 | 3/1977 | Brown | 350/167 |
| 4,035,579 | 7/1977 | Roberts | 350/167 |
| 4,072,098 | 2/1978 | Granzow et al. | 340/146.3 P |
| 4,137,077 | 1/1979 | Credelle et al. | 96/1.1 |

FOREIGN PATENT DOCUMENTS 682853 11/1952 United Kingdom ............... 430/946

OTHER PUBLICATIONS

Griot, "Prism Potpourri", Electro-Optical Systems Design, p. 28, 3/1976.
Classification Definitions, pp. 350-366, Mar. 1973.

Primary Examiner—Stanley S. Silverman
Attorney, Agent, or Firm—Donald M. Sell; James A. Smith; Mark A. Litman

[57] ABSTRACT

Articles having on one surface thereof a linear prism array and a diffraction grating on the opposite surface are provided which are suitable for the preparation of projection transparencies.

9 Claims, 7 Drawing Figures

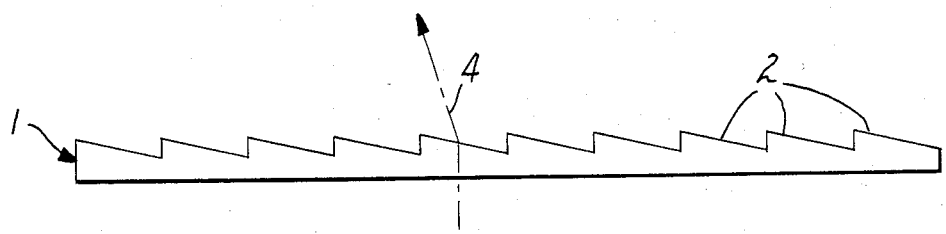
FIG. 1
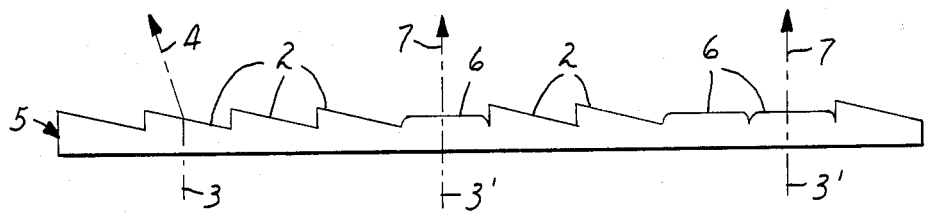
FIG. 2
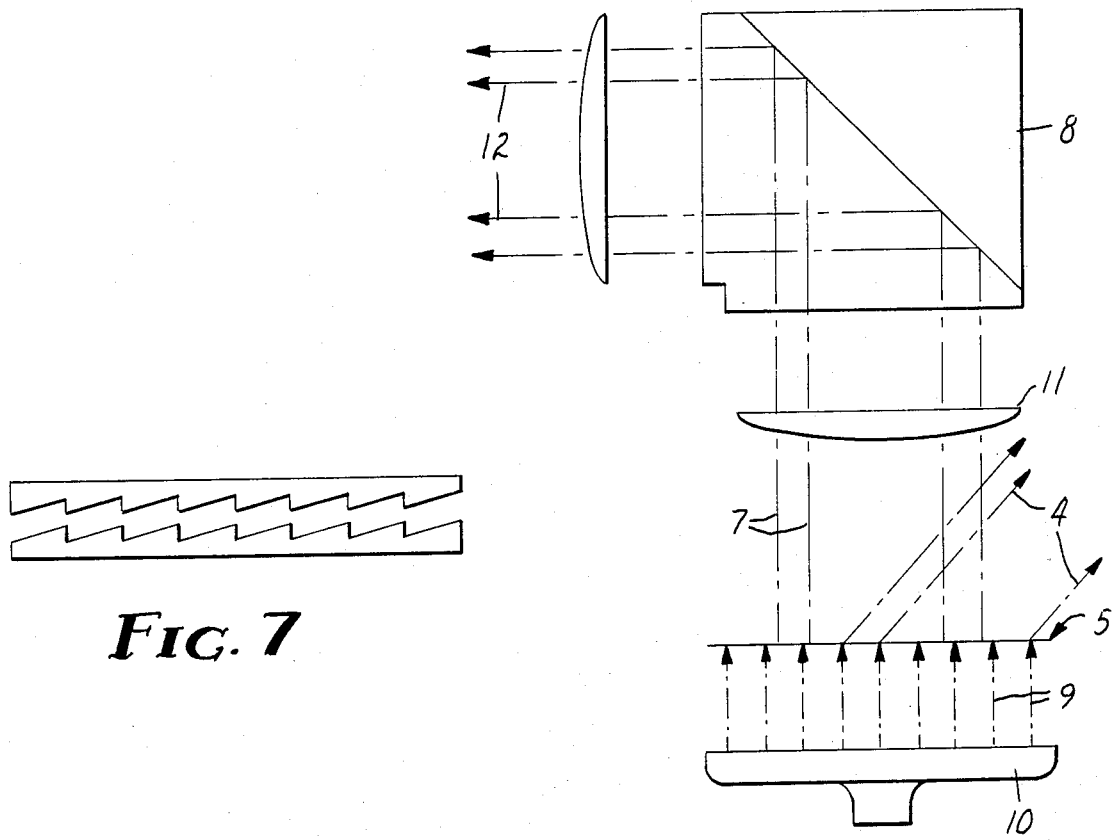
FIG. 7
FIG. 3

IMAGEABLE PRISMATIC ARRAY

FIELD OF THE INVENTION

This invention relates to the technological area known as graphic arts and particularly relates to transparencies which may be projected in a positive or negative mode in either black-and-white or colors.

DESCRIPTION OF THE PRIOR ART

Projection transparencies are copies of graphic subjects on transparent or translucent film. These copies are usually projected onto screens or walls and enlarged by means of transmitted light for viewing by groups of people. Normally, image areas of the subject are projected as black (essentially no light projection) on a background of maximum light projection. For example, a projection transparency made from typewritten text on bond paper would consist of non-projecting (black) type characters upon a clear background. The blocking of light in the image areas is accomplished by the use of non-light transmitting or light scattering substances in those areas.

Various modifications of this basic system are in use. For example, the image areas may transmit light while the background transmits no light, or colored light. The reverse may also take place, or the projection may be multicolored. Essentially, however, any projection transparency is a duplication of an original graphic subject. Such a duplication consists of light absorbing and light transmitting areas representing the original subject. The duplication is capable of being projected by transmitted light.

A number of methods are in use, or have been proposed, for the production of projection transparencies. They include methods generically characterized as photographic, diazotype, dichromate hardening, and electrostatic methods, as well as various forms of thermographic methods. All of these methods are subject to one or more disadvantages, the more important of which are the necessity for use of expensive equipment, the use of wet processing techniques, the necessity for production from a transparent or translucent original, the failure to produce sharply defined images, and the necessity for the developing of latent images.

A number of other methods are in use, or have been proposed, that utilize the transparentizing of areas of an opaque background to produce projection transparencies of white images on a dark background. Examples of such methods are taught in U.S. Pat. Nos. 3,083,132 and 3,763,779, among many others. None of these methods, however, produce transparencies which may be projected in either a positive or negative or colored mode.

SUMMARY OF THE INVENTION

In accordance with this invention, there is provided a process for projecting a single transparency in either a positive or negative mode or in various combinations of black, white and color. There is also provided articles suitable for providing projection transparencies for use in this process which articles can be imaged by impact or embossing, such as by use of a typewriter, or thermally such as by use of a thermographic copier.

The articles of the present invention comprise transparent sheets bearing on one surface thereof a system of ordered and preferably parallel prisms (hereinafter referred to as prism transparency) or diffraction grating (hereinafter referred to as a grating transparency) in a non-stress relieved (i.e., stressed) thermoplastic resin. Images are formed by imagewise obliteration of the prisms or gratings by impact or by heat. On projection, such as with an overhead projector, the images are projected in the negative mode on a white screen as white (colorless) images on a black background.

DETAILS OF THE INVENTION

The projection transparencies of the present invention can be films or laminates of any transparent or translucent polymer that has a softening temperature of between 50° C. and 200° C. The projection transparencies of these polymers have a prism or grating array on at least one surface thereof and exhibit surface strain in the array. The presence of this strain can be detected by inspection of the sheet through a polariscope. A polariscope is an instrument which has two transparent polarized sheets through which the light to be viewed is transmitted. The planes of polarization of the two sheets are perpendicular to each other. Both polarized sheets are rotated during viewing to show any polarization existing in the viewed light. This is preferably done between 100 and 200 candle power illumination at one meter. Most preferably it is done at 150 meter candles illumination. The minimum and maximum optical densities are viewed at different positions of rotation of the two polarized sheets. By placing the transparency under observation in the polariscope and rotating the transparency, strain is indicated by the observation of changes in intensity of the light being transmitted through the transparency. To be useful in the practice of the present invention, a transparency must exhibit a change in optical density (hereinafter O.D.) from the greatest transmittance to the least transmittance of at least 0.2. Preferably the change in optical density is at least 0.3 or 0.5, and may be 1.0 and higher.

The value for the change in optical density measured in this fashion shall hereinafter be referred to as rotational polarized variance (or RPV).

The particular composition of the polymer, as long as it is transparent or translucent and exhibits the necessary RPV, is unimportant. Suitable polymers are thermoplastic and include but are not limited to polyesters and copolyesters (such as those prepared by the reaction of a glycol, e.g., ethylene glycol, with one or more dicarboxylic acids, e.g., terephthalic acid, isophthalic acid, sebacic acid, and adipic acid), vinyl resins such as vinylidene chloride polymers and copolymers (as with comonomers such as vinyl acetate, vinyl chloride, and acrylonitrile), polyolefin polymers (e.g., polypropylene) and copolymers (e.g., poly(ethylene/vinyl acetate), cellulosic ethers (e.g., methyl cellulose), cellulosic esters (e.g., cellulose acetate, cellulose butyrate, and cellulose propionate), polyacrylates (e.g., polymethyl methacrylate), polyvinyl acetals (e.g., polyvinylformal), polyethylenically unsaturated materials (e.g., polystyrene), and polyamides (e.g., nylon-6,6). Laminates of such films or coatings of such materials on a non-thermoplastic substrate can also be used for the projection transparency.

The essential phenomena by which the present invention works may be understood by reference to the drawings.

FIG. 1 shows a projection transparency (1) of the present invention comprising an ordered array of prismatic surface elements (2) of a transparent polymer. Perpendicular light waves (3) entering from the flat backside of the transparency are refracted upon exitting from the prism surface to form a light wave (4) which is non-parallel to the entering light waves (3).

FIG. 2 shows an imaged projection transparency (5), the imaging having occurred by the conversion of prismatic surface elements (2) to essentially non-refractive shapes (6). Perpendicular light waves entering from the flat backside of the transparency (3) which exit from a prismatic surface are still refracted to form a light wave (4) which is non-parallel to the entering light wave (3). Perpendicular light waves (3') which exit from the transparency through surfaces which have essentially non-refractive shapes (6) exit the transparency as light waves (7) which are essentially parallel to the entering light waves (3' and 3).

FIG. 3 shows the effect of projecting light through an imaged projection transparency (5) in an overhead projector. Light (9) from a lamp (10) is shown through the imaged projection transparency (5). In those areas of the projection transparency where the prisms remain intact (the unimaged areas), light exits from the sheet as light (4) which is sufficiently non-perpendicular to the projection transparency so that it does not enter the collection lens (11) of the over head projector (8). In those areas of the projection transparency where the prisms have been changed to non-refracting shapes (the imaged areas), the light (7) exits perpendicularly to the projection transparency (5) and enters the collection lens (11) of the over head projector (8). This light is then emitted from the projector as an imagewise array of light (12) which can be viewed on a screen.

In the above descriptions, it should be noted that the essentially non-refracting shape of the imaged area may be any shape or texture which allows the light to exit from the transparency at an angle which is substantially parallel to the entering light source or substantially perpendicular to the overall plane of the projection transparency. The transparency may also be positioned with the refractive array surface facing the entering light source with substantially identical results.

FIG. 4 shows how the projection transparencies of the present invention may be used in either a positive or negative mode. As in FIG. 2, entering light (3) which exits from the imaged projection transparency (5) through a surface prismatic element exits as light (4) which is refracted at an angle so that it is not parallel to the entering light (3). Entering light (3') which exits through a non-refracting surface area (6) remains essentially parallel to the entering light (3 and 3'). If a second prismatic element (13) having a matching array of surface prisms (14) is placed in parallel juxtaposition to the first prismatic sheet so that it is struck by the exitting light (4 and 7), that light (7) which was parallel to the original light source is now refracted and exits the second prismatic element (13) as light (15) which is no longer parallel to the original light source (3). On the other hand, light (4) which exitted the imaged projection transparency (5) at an angle is refracted again so that this light when exitting (16) the second prismatic element (13) is essentially parallel to the original light source (3). As the image on the imaged projection transparency (15) was originally projected in a negative mode, the image emitted from the second prismatic element (13) is now in a positive mode.

Figure 5:
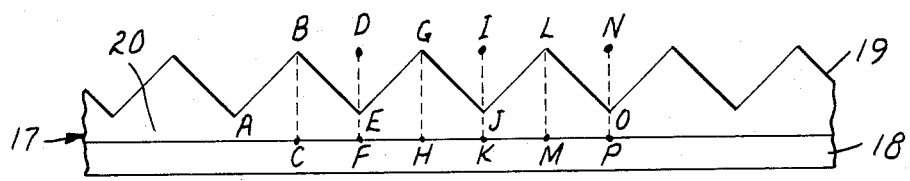

FIG. 5 is used to illustrate the dimensions which are best suitable for prism transparencies of the invention, although any angles sufficient to divert the light by diffraction can work. A cross-section of a linear prism array (17) is shown. The section shows a support layer (18) and prisms (19) in linear array. The prisms have peaks B, G, and L and valleys A, E, J, and O. Lines $\overline{BC}$, $\overline{DF}$, $\overline{GH}$, $\overline{IK}$, and $\overline{LM}$ are normal to the back surface of the prismatic array layer (20). In the array, ∠ABC, ∠EGH, and ∠JLM may be any angle from 50° to 85°, but preferably is 70° to 80°. ∠CBE, ∠JGH, and ∠OLM can be from +10° to −85°, but preferably is 0° (e.g., $\overline{BE}$, $\overline{GJ}$, and $\overline{LO}$ is normal to the back surface [$\overline{CFHKMP}$]of the prismatic array layer 20). The periodicity of the prisms (i.e., the distance between peaks, represented by $\overline{BG}$, $\overline{GL}$, etc.) can be up to 1000 microns (approximately 1 prism per mm or 25 prisms per inch). Generally the periodicity should be between 25 to 1000 microns (1 to 40 prisms per mm), preferably between 50 and 500 microns (2 to 20 prisms per mm). The depth of cuts $\overline{DE}$, $\overline{IJ}$, and $\overline{NO}$ depends upon the angle of the cut (e.g., ∠BEG) and the periodicity, can be up to about 800 microns but should generally be between 15 and 150 microns. The thickness of the polymeric material below the valleys (i.e., $\overline{EF}$, $\overline{JK}$, and $\overline{OP}$ ) may be 0 to 1000 microns (actually the thickness is not important) but preferably is from about 25 to 1000 microns. Where this thickness is less than about 25 microns, a support layer (18) can be advantageously used. For greater thicknesses, a support layer is not needed, but may be used. When used, the support layer may be from 10 to 1000 microns or more in thickness. Preferably it would be from 25 to 500 microns in thickness.

The above descriptions have already explained how a light image on a black background could be projected (FIGS. 2 and 3), and how a black image on a light background could be projected (FIG. 4). The projection transparencies of the present invention are quite versatile and also generate, from white light, (1) light images on a colored background, (2) colored images on a light background, (3) colored images on a background of another color, (4) colored images on a black background, and (5) black images on a colored background.

Colors are produced in the use of projection transparencies by taking advantage of the fact that the different components of white light (i.e., the different colored portions of the visible region of the electromagnetic spectrum, red, orange, yellow, green, blue, indigo, and violet) refract at different angles. By placing a collecting or focussing lens in such a position so as to focus onto a screen only light striking it at certain angles, the color which is projected can be controlled.

Figure 6:
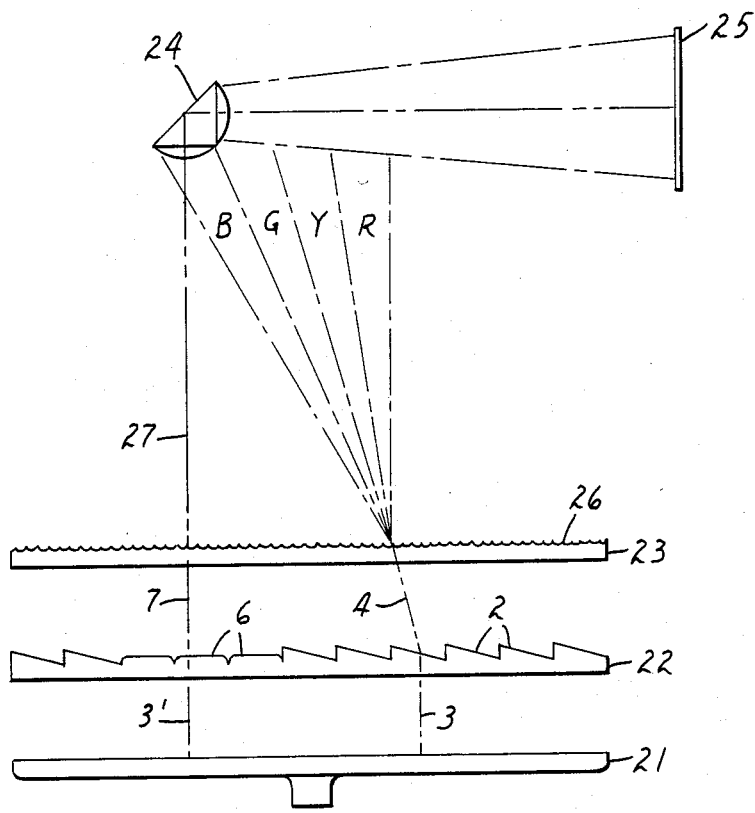

FIG. 6 illustrates the manner in which a light (or white) image on a colored background can be formed. In practicing the procedure a light source (21) is used in combination with an imaged projection transparency (22) of the present invention, a diffraction grating (23), a lens (24), and a screen (25). The gratings (26) can be 150 to 1500 lines per mm. Preferably there are 300 to 1000 lines per mm, with the grating oriented so that the grating lines are substantially parallel to the array of prisms in the projection transparency (22). By placing the assembly of the transparency (22) and grating (23) in a path of light (3 and 3'), the rays of light (7) which pass through deformed, non-refracting (imaged portions (6) of the projection transparency, pass through the grating in a perpendicular, non-diffracting path (27) and are focussed as essentially white light (28) by the lens (24). Rays of light (4) which exit from the projection transparency through refracting prism surfaces (2) pass through the diffraction grating at an angle other than 90° to the plane of the grating and form a first order spectrum (represented by lines R, Y, G and B) with each light component diffracted at a different angle. Depending upon the angle of the prism faces (2) in the projection transparency (22) and the period of the lines (26) in the diffraction grating (23), only light of particular wavelengths in the spectrum are focussed on the screen (25) by the lens (24). The image thereby formed is a negative image. That is, the image is essentially white and the non-imaged area is the color of the particular wavelengths of light (λ) focussed by the lens (24).

The relationship of the wavelength in Angstrom units of light focussed (λ), refractive index of the polymeric material of the prism array (μ), prism angle (α, representing ∠ABC in FIG. 5), and the grating period (as the inverse of lines per millimeter) in the diffraction grating (d) can be expressed by both of the formulae:

$$\lambda = d \, \text{Sin} \, [\text{Sin}^{-1}[\mu \text{Cos} \, \alpha] - (90° - \alpha)] \qquad \text{I}$$

and $$\alpha = \text{Tan}^{-1}\left[\frac{\text{Sin}\beta - \mu}{\text{Cos}\beta}\right], \text{ where } \beta = \text{Sin}^{-1}\frac{\lambda}{d} + 90° \qquad \text{II}$$

and by variation of these parameters, the requirements for various colors can be calculated. Thus, for the embodiment where the projection transparency is placed between the light source and the diffraction grating, the various colors shown in Table I can be obtained where = 1.5 and d and are shown.

TABLE I

| Apparent color of Projected Light | Wavelength Angstroms λ** | Prism Angle, α, (in degrees) Grating Period, 1/d, (lines/mm) | | | |
|---|---|---|---|---|---|
| | | 300 | 600 | 900 | 1200 |
| Red | 6500 | 69.4 | 56.0 | 49.7 | * |
| Orange | 5900 | 71.1 | 57.9 | 50.9 | 48.3 |
| Yellow | 5700 | 71.6 | 58.6 | 51.4 | 48.4 |
| Green | 5200 | 73.1 | 60.4 | 52.8 | 49.0 |
| Blue | 4900 | 74.0 | 61.6 | 53.8 | 49.6 |
| Violet | 4400 | 75.5 | 63.8 | 55.8 | 51.0 |

*Angle is such that internal reflection takes place and no color formed
**Approximate mean wavelength of the color projected.

It is apparent from Table I that for diffraction gratings having from about 300 to 1200 lines per millimeter, that for a given diffraction grating, any color of the spectrum may be obtained by selection of a particular prism angle. It may also be seen that for a particular grating period, a small change in prism angle produces a comparatively large change in color. Thus, for example, with a grating having 600 lines per millimeter, a six degree change in prism angle (from 56° to 64°) produces a change in projected color from red to violet.

In a preferred embodiment of the invention, projected images are obtained from a projection transparency having a diffraction grating on the lower surface and a linear prism array on the upper surface of a sheet of thermoplastic material. As with the embodiment described above, images produced in the prism array by determining the array in accord with a pattern can be projected in the negative mode; that is, the image areas project white and the non-imaged areas are colored. For this embodiment, the relationship of wavelength, refractive index of the sheet material, the prism angle, and the grating period can be expressed by the formulae:

$$\lambda = d\mu \, \text{Sin}\left[90° - \alpha - \text{Sin}^{-1}\left(\frac{\cos\alpha}{\mu}\right)\right] \qquad \text{III}$$

and $$\alpha = \text{Tan}^{-1}\left[\frac{\mu \text{Sin} \, \delta - 1}{\mu \text{Cos} \, \delta}\right], \text{ where } \delta = 90° - \text{Sin}^{-1}\frac{\lambda}{d\mu} \qquad \text{IV}$$

wherein λ, d, μ, and α are defined as above.

Prism angles and grating periods necessary to provide various colors in accordance with Formulas III and IV are shown in Table 2.

TABLE 2

| Apparent Color of Projected Light | Wavelength Angstroms λ** | Prism Angle, α, (in degrees) Grating Period, 1/d, (lines/mm) | | | | |
|---|---|---|---|---|---|---|
| | | 300 | 600 | 900 | 1200 | 1500 |
| Red | 6500 | 68.2 | 49.0 | 33.1 | 19.8 | 8.2 |
| Orange | 5900 | 70.1 | 52.3 | 37.2 | 24.5 | 13.4 |
| Yellow | 5700 | 70.8 | 53.4 | 38.6 | 26.1 | 15.2 |
| Green | 5200 | 72.4 | 56.3 | 42.2 | 30.3 | 19.8 |
| Blue | 4900 | 74.0 | 59.2 | 46.1 | 34.7 | 24.7 |
| Violet | 4400 | 77.4 | 65.3 | 54.2 | 44.3 | 35.3 |

**Approximate mean wavelength of the color projected.

It is apparent from Table 2 that with projection transparencies having a diffraction grating on the lower surface and a prism array on the upper surface for a particular grating period, a comparitively large change in prism angle is necessary to produce a change in color. For example, with a grating having 600 lines per millimeter, a change of 16 degrees in prism angle from 49° to 65°) produces a change in projected color from red to violet; and with a grating having 900 lines per millimeter, a change of 22 degrees in prism angle (from 33° to 55°) produced the same color change.

By placing a diffraction grating and a second prism array (in any sequence) between the light source and the first prism array, an essentially white background can be obtained. The second prism array does not have to be stressed and does not have to display any RPV. The second prism array may also have the diffraction grating embossed on its reverse side. In this white light displaying embodiment, the prisms in the non-imaged areas of the first array are superimposed over the grating and second prism array and redirect the diffracted light so that it passes through the combination of three elements as essentially colorless light. In the imaged areas of the projection transparency, the combination of elements produces color. To have this effect, the prisms in the transparency should not have face angles (e.g., ∠ABC) which differ by more than ±10° from the prisms in the second prism array.

By using a diffraction grating and second prism array between the light source and the prism transparency of the present invention in which the facial angles of the prisms in the projection transparency differ by more than 10° (and preferably more than 30°) from the facial angle of the prisms in the second array, color images on a background of a different color are obtained. The color produced in the background results from the combination of the diffraction grating and the sum of the effective angle produced in both the prism transparency and the diffraction grating.

Colored images on a black background are obtained by using the same elements used above for producing a colored image on a background of a different color, but with the sheets so oriented that the prisms of the projection transparency are perpendicular to the prisms of the second array.

The combination of a non-stressed prism array and diffraction discussed above is itself an imageable element useful in transparencies. By impacting either surface of this element (as with a typewriter or stylus) different effects can be produced upon display of the element. If the prism array is impacted so as to flatten prisms, a white image on a colored background is produced. If the diffraction grating is struck or pressed to flatten it out, a black image on a colored background is produced upon projection.

A combination of a stressed prism array and diffraction grating will also produce these effects and may be imaged by thermographic processes. If the prisms and the diffraction grating are stressed (e.g., simultaneously molded), either side may be imaged thermographicly. If the prisms are stressed and the diffraction grating unstressed (by laminating the preformed individual articles), only the prisms may be thermographicly developed and vice versa.

EXAMPLE 1

A linear prism array was prepared in a press by pressing with a metal mold having a prism array cut therein at a temperature of 120° C. A 4 mil (100 micron) thick sheet of cellulose acetate butyrate (CAB) was pressed for 3 minutes and rapidly cooled in the assembly. The prisms in the mold had one side normal to the sheet and the other side 75° from normal (i.e., in FIG. 5, ∠ABC is 75° and ∠CBE is 0°) and the depth of cut (i.e., $\overline{DE}$ in FIG. 5) was 1.34 mil (33.5 microns) and the periodocity (i.e., $\overline{BG}$ in FIG. 5) was 5 mil (125 microns) corresponding to a frequency of 200 prisms per inch (8 prisms per millimeter).

The above sheet of prism arrays was placed together with an original printed sheet having an infrared absorbing character and passed through a "Thermofax" ® machine (which heats the sheet to about 120°–130° C. for 3 to 5 seconds by infrared radiation). There was obtained an image on the prism array wherein the prisms of the array were deformed in accordance with the heat absorbing portions of the original image.

On placing the imaged linear prism array on the stage of an over head projector, there was projected onto a screen a negative image of the original. A light meter at the screen indicated approximately 55.0 foot candles in the image areas and 6.9 foot candles in the background areas at a distance of 8 feet from the projector.

A similar sheet of prism arrays was also imaged by use of a blunt stylus and by impact in a typewriter whereby the prisms of the array were deformed. On placing on the stage of an overhead projector, a negative image was projected onto the screen.

By superposing on the imaged linear prism array a non-imaged prism array prepared as described above so that the prisms of both arrays are parallel but the prisms of the sheets are 180° out of phase with respect to each other, a dark image on a light background was obtained. Approximately 55.0 and 6.8 foot candles were measured in the image areas and background areas respectively.

CAB sheets 4 mil (100 microns) in thickness were embossed as described in Example 1 to provide 75° prism arrays having 10 to 16 prisms per millimeter as follows:

|   | Depth of Cut $\overline{DE}$ (microns) | Periodocity $\overline{CH}$ (microns) | Frequency Prisms/mm |
|---|---|---|---|
| B. | 27 | 100 | 10 |
| C. | 22 | 82.5 | 12 |
| D. | 19 | 71.5 | 14 |
| E. | 17 | 62.5 | 16 |

Each of the above sheets were imaged with infrared radiation as in Example 1 to provide overhead transparencies that could be projected in the positive or negative mode. Sheet "E" provided particularly high resolution images (eight line pairs per millimeter).

Interesting presentations were made by placing on the stage of an overhead projector a first prism array bearing one message prepared as described above, it being projected in the negative mode onto the screen. A second prism array bearing a second message and having prisms rotated 180° was then placed on the first prism array keeping the prisms parallel. Instantly there appeared on the screen both messages in the positive mode.

EXAMPLE 2

To illustrate the criticality of the molding operation for obtaining stress in the projection transparency and quality projection images, 0°/75° prism arrays were prepared by pressing the array mold and various 100 microns thermoplastic sheets in a press at various temperatures for various times. The thermoplastic, time and temperature of molding used and the quality of images obtained on projection of each sheet that had been imaged as in Example 1 (120°–130° C. for 3 to 5 seconds) are given in the following table.

| Thermoplastic | Molding Time | Temperature | Projection Image Quality |
|---|---|---|---|
| (a) Polystyrene | 10 min. | 175° | Very poor |
|  | 5 min. | 175° | " |
|  | 3 min. | 175° | " |
|  | 1 min. | 175° | " |
|  | 20 min. | 130° | Poor |
|  | 10 min. | 130° | Fair |
|  | 5 min. | 130° | Fair |
|  | 10 min. | 115° | Poor |
|  | 5 min. | 115° | Fair |
|  | 3 min. | 115° | Good |
| (b) Cellulose Acetate Butyrate | 10 min. | 130° | Poor |
|  | 2 min. | 130° | Poor |
|  | 1 min. | 130° | Fair |
|  | 30 sec. | 130° | Excellent |
|  | 15 min. | 115° | Poor |
|  | 10 min. | 115° | Fair |
|  | 5 min. | 115° | Excellent |
| (c) "Suryln"* | 3 min. | 120° | Poor |
|  | 1 min. | 120° | Fair |
|  | 30 sec. | 120° | Excellent |

*A zinc neutralized copolymer of acrylic acid and ethylene available from E. I. duPont Company.

EXAMPLE 3

When Example 1 was repeated using in place of the cellulose acetate butyrate film a polypropylene film extruded from Hercules Polypropylene 6523 at 250° C. for 5 seconds, a prism array was obtained that was imaged as in Example 1 at 120°–130° C. in 2 to 4 seconds and projected as described in Example 1.

Similar results were obtained when a 3 mil sheet of polyester bearing a 1.5 mil (37 microns) layer of polyethylene was used in place of the polypropylene sheet, the embossings being made in the polyethylene layer.

Similar results were obtained when Example 1 was repeated using a 3 mil (75 micron) sheet of polystyrene in place of CAB. The linear prism array required 6-10 seconds at 120°-130° C. in a "Thermofax" ® machine to be imaged.

EXAMPLE 4

Prism arrays prepared as in Example 1 having an ∠ABC of 70° and a depth of cut ($\overline{BC}$ in FIG. 5) of 1.34 mils (33.5 microns) and a periodocity ($\overline{CH}$ in FIG. 5) of 3.68 mils (92 microns) corresponding to a frequency of about 271 prisms per inch (10.9 prisms per millimeter) were imaged by placing it on a black and white original and passing them through a "Thermofax" ® machine. There was obtained an image that could be projected in the negative or positive mode as was done in Example 1.

EXAMPLE 5

A linear prism array was prepared in a polypropylene film as described in Example 1 so that ∠ABC and ∠CBE as shown in FIG. 5 were each 45° (∠ABE and ∠BEG therefore were 90°). Depth of cut ($\overline{DE}$ in FIG. 5) was 2.5 mil (62.5 microns) and the periodocity ($\overline{CH}$ FIG. 5) was 5 mil (125 microns) corresponding to a frequency of 200 prisms per inch (8 prisms per millimeter). These prism arrays could be imaged in a "Thermofax" ® machine and the overhead projection transparency projected in a negative mode; and when assembled with a "mode change sheet" having 45°±10° prisms as in Example 1, could be projected in the positive mode.

By assembling the imaged 90° (−45°, +45°) prism array described above with a transparent sheet bearing a diffraction grating of 888 lines per millimeter so that the prism lines were parallel to the grating lines and placing the assembly on the stage of an overhead projector, colorless (light) images on a blue background were projected onto the screen. By combining the diffraction grating with an unimaged prism array and placing either on or underneath the imaged 90° prism array, blue images on a black background were obtained. By placing the combination of diffraction grating and unimaged prism array so that the prisms and gratings are perpendicular to the prisms in the image array, a particularly desirable contrast of blue on black background was obtained.

Particularly desirable results were also obtained when the diffraction grating and the unimaged prism array were embossed on opposite sides of a transparent thermoplastic sheet and this used in place of the above combination. As with any of the combinations of gratings and prismatic transparencies described in the practice of the present invention, separate sheets may be placed together or a single sheet may be embossed on opposite faces to produce the desired results.

EXAMPLE 6

When a prism array was prepared as described in Example 1 so that ∠ABC and ∠CBE as shown in FIG. 5 were each 40° (∠BEG therefore being 80°), overhead projection transparencies were obtained as in Example 4 with the exception that green was the projected color rather than blue.

EXAMPEL 7

An imaged 0°/75° prism array prepared as described in Example 1 was combined with a transparent sheet having −45°/45° prisms on one surface and an 888 line diffraction grating on the other surface and placed on the stage of an overhead projector. There was projected onto the screen blue images on an orange background when the lines of the prisms and gratings were parallel. By rotating the combined grating and prism sheet, the background became black. The color produced is independent of the position of the sheets in the assembly. That is, either sheet may be turned over or placed on or under the other sheet and blue images on an orange background obtained when the lines of the prism and gratings are parallel, and blue images on a black background when the lines of the imaged prisms are perpendicular to the lines of the combined grating and prism sheet.

EXAMPLE 8

Example 6 was repeated using as the combined prism and grating sheet a transparent sheet bearing a −40°/40° prism array on one surface and an 888 line diffraction grating on the other surface. There was projected onto the screen green images on a violet background when the lines of the color-producing sheet and the imaged prism array were parallel and green images on a black background when the lines were perpendicular.

EXAMPLE 9

A series of "color-producing sheets" having diffraction grating of various frequencies on one surface and various angles ABC (in FIG. 5) on the other surface were prepared by embossing 100 micron cellulose acetate butyrate in a press at 120° C. for 3 minutes. The various "color-producing sheets" and the color they produced on the stage of an overhead projector is shown in the following table.

| Prism Angle* | Period of Diffraction Grating (lines/mm) | | | |
|---|---|---|---|---|
| | 533 | 640 | 800 | 888 |
| 36° | | | | Orange |
| 44° | | | Orange | Green |
| 47° | | Orange | Blue-green | Blue |
| 52° | | Yellow | Blue-green | Violet |
| 54° | Green | Blue | Violet | |
| 60° | Green | Blue | Violet | |

*∠ABC in FIG. 4.

When these "color-producing sheets" were used on top of an imaged 0°/75° prism array and placed on the stage of an overhead projector, images in the color produced by each sheet on backgrounds of various colors were obtained.

EXAMPLE 10

A diffraction grating having 888 lines per millimeter was prepared on a 4 mil (100 micron) sheet of cellulose acetate butyrate by pressing the sheet for 3 minutes in a metal mold at a press temperature of 120°, the mold having such a grating etched therein. This sheet was imaged by placing together with an original having an infrared absorbing pattern and passing through a "Thermofax" ® machine (120°-130° C. for 3 to 5 seconds). The imaged sheet was assembled with a −45°/45° prism array sheet and placed on the stage of an overhead projector whereon the pattern was projected in black on a blue background.

When the −45°/45° prism array sheet was replaced by a −40°/40° prism array, images in black on a green background were obtained.

When the −45°/45° prism array sheet was replaced by a −35°/35° prism array, images in black on an orange background were obtained.

EXAMPLE 11

A positive-acting single sheet projection transparency was produced by pressing for 3 minutes at 120° C. a 7 mil (155 microns) sheet of cellulose acetate between two nickel plated platens, each having a 0°/75° prism array cut therein. The platens were arranged so that the prisms array and their prism faces were essentially parallel as is shown in FIG. 7. The pressed sheet exhibited a change in optical density of at least about 0.6 when rotated 90° in a polariscope. This sheet was imaged as in Example 1 at 120°–130° C. for 3 to 5 seconds. When placed on the stage of an overhead projector, opaque images on a clear background were obtained.

What is claimed is:

1. An article suitable for the preparation of projection transparencies capable of providing a projected image based on non-diffused refraction of light comprising a sheet of transparent thermoplastic material having molded on one side thereof a linear prism array having sufficient molding stresses locked therein to exhibit a variation of at least 0.2 between the maximum and minimum optical density viewed through two polarized sheets with their axes of polarization perpendicular to each other wherein a linear prism array is on one side of the sheet and a diffraction grating is on the other side.

2. Projection transparencies comprising the article of claim 1 having areas of the diffraction grating deformed in accordance with a pattern.

3. An article suitable for the preparation of projection transparencies capable of providing a projected image based on non-diffused refraction of light comprising a sheet of transparent thermoplastic material having molded on one side thereof a linear prism array having sufficient molding stresses locked therein to exhibit a variation of at least 0.2 between the maximum and minimum optical density viewed through two polarized sheets with their axes of polarization perpendicular to each other said article having a second sheet juxtaposed in parallel therewith, the second sheet being a transparent sheet having a linear prism array thereon, the prism arrays of both sheets so arranged that light entering one sheet perpendicular to the plane of the sheet will exit the second sheet perpendicularly to the plane of the second sheet.

4. The article of claim 3 having a diffraction grating on the opposite side of said sheet.

5. The article of claim 3 in which the prisms are parallel and in which the faces of adjacent prisms in the linear prism array form an angle between them.

6. The article of claim 3 having a second linear prism array on the opposite side of said sheet.

7. An article suitable for the preparation of projection transparencies comprising a sheet of transparent thermoplastic material having on one face thereof a linear prism array and on the other face thereof a diffraction grating.

8. An article suitable for the preparation of projection transparencies capable of providing a projected image based on non-diffused refraction of light comprising a sheet of transparent thermoplastic material having molded on one side thereof a linear prism array having sufficient molding stresses locked therein to exhibit a variation of at least 0.2 between the maximum and minimum optical density viewed through two polarized sheets with their axes of polarization perpendicular to each other wherein a linear prism array is on both sides of the sheet.

9. An article suitable for the preparation of projection transparencies capable of providing a projected image based on non-diffused refraction of light comprising a sheet of transparent thermoplastic material having molded on one side thereof a linear prism array having sufficient molding stresses locked therein to exhibit a variation of at least 0.2 between the maximum and minimum optical density viewed through two polarized sheets with their axes of polarization perpendicular to each other said article having a second sheet juxtaposed in parallel therewith, the second sheet being a transparent sheet having a diffraction grating thereon.

* * * * *